(No Model.)

G. J. CAVE.
MEASURING VESSEL.

No. 268,186. Patented Nov. 28, 1882.

Attest:
Charles H. Fell
J. A. Henrich

Inventor
George J. Cave,
by O. Drake,
Attorney.

UNITED STATES PATENT OFFICE.

GEORGE J. CAVE, OF ELIZABETH, NEW JERSEY.

MEASURING-VESSEL.

SPECIFICATION forming part of Letters Patent No. 268,186, dated November 28, 1882.

Application filed June 14, 1882. (No model.)

*To all whom it may concern:*

Be it known that I, GEORGE J. CAVE, a citizen of the United States, residing at Elizabeth, in the county of Union and State of New Jersey, have invented certain new and useful Improvements in Beer-Measures; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of measuring-vessels designed to automatically indicate from the outside the quantity of beer or other fermenting liquor as it is poured into said measuring-vessels, the object being to save labor and material in the construction and render the vessels less liable to get out of repair.

The improvements will be hereinafter fully shown and described, and finally pointed out in the claims.

Figure 1:
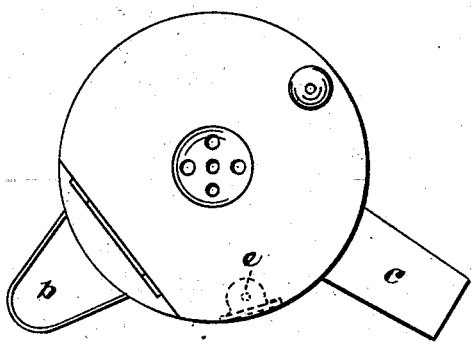
Figures 2, 4, 5:
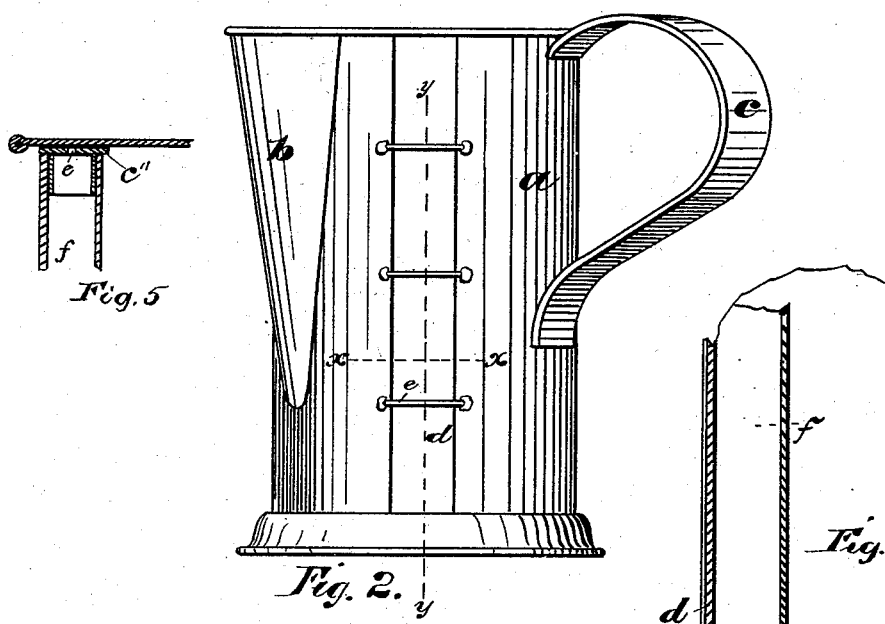
Figure 3:
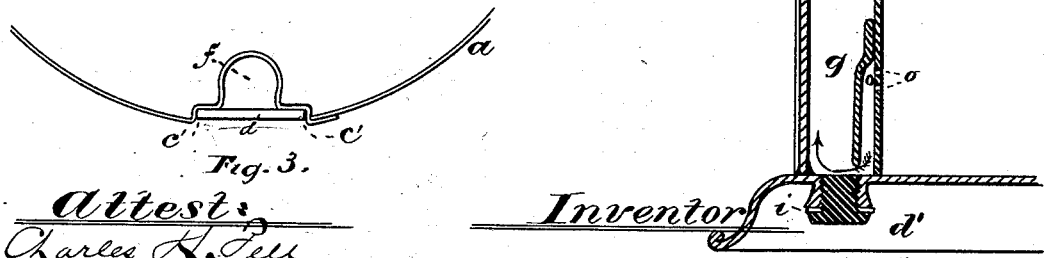

In the drawings, in which similar letters of reference indicate corresponding parts in each of the several figures, Figure 2 represents an elevation of a beer-measure embodying my improvements; Fig. 1, a plan; Fig. 3, a section through line $x$ of Fig. 2; Fig. 4, a section through $y$ of Fig. 2; and Fig. 5 is a detail view.

Heretofore measures of this class have in some cases been provided with a separate glass tube, or a measuring-tube formed by the conjunction of a separate strip of metal bent and soldered to the inside of the measure, with a flat strip of glass on the outside, and connecting with a box or trap attached to the bottom, either on the inside or outside of the measure, in various forms, all of which are more or less complicated, expensive, and in divers other respects objectionable.

In carrying out my invention I neither employ a separate glass tube nor a strip of metal soldered upon the inside of the trap, but form a recess or channel, $f$, by means of suitable mechanism in the metal itself of which the body of the measure is composed, and also recesses $c'$ to receive the flat strip of glass $d$, which, in conjunction with said channel $f$, forms the measuring-tube, leaving but one joint or seam in the body of the measure to be soldered, as will be obvious. The usual transverse bars or marks $e$ on the glass indicate the quantity of liquid in the measure. A suitable stopper or cap, $c''$, is fitted into the top of the measuring-tube, provided with a vent, $e$, and also a plug or stopper, $d'$, is fitted in an aperture at the bottom and communicating with the measuring-tube, both of which are removable or adjustable in order to facilitate the cleansing of said tube when requisite so to do. The last-mentioned plug and aperture are especially designed to facilitate the cleansing of the bottom portion of the measuring-tube behind or inside of the partition, as this portion can be reached in no other way, and are preferably screw-threaded, and a rubber or other elastic or flexible washer or packing, $i$, is adjusted between the flange of the plug and the shoulder of the aperture, to insure a liquid-tight joint, as will be readily understood.

On the inside of and extending across the channel or measuring-tube is secured, by solder or otherwise, a partition or fender, $g$, extending from a point near the bottom of the tube upward—say about an inch, more or less—as indicated in Fig. 4; and just below the top of the fender the metal forming the channel aforesaid, in order to admit the flow of the beer into the measuring-tube as it is poured into the body of the measure, is pierced either by a single perforation, $o$, or by a series of smaller perforations, which latter, in some cases, are preferable, as being more likely to prevent foam or foreign substances from entering the measuring-tube, as will be manifest.

It will be understood that the measuring-tube is hermetically sealed at the bottom. Thus it will be seen that after the body of the measure has been emptied of its contents a small quantity of the liquor will remain in the measuring-tube, filling it up to the perforation or perforations aforesaid, which, in consequence or by means of the said partition, will always effectually prevent any foam from entering said tube when fresh beer is poured into the body of the measure, and whereby the quantity of clear beer in the measure will be instantaneously indicated in said tube, as will be obvious.

From the above it will be manifest that the capacity of the measuring-tube above the perforation or perforations should be about equal to that of the portion of said tube below the perforations, so that the said lower portion will be filled by the beer in the tube flowing back to the bottom thereof after the contents of the measure have been poured out, and as a consequence the liquor thus remaining in the lower portion of the tube will, when fresh beer is poured into the measure, by virtue of the location of the partition aforesaid, as above intimated, be instantly forced up into the measuring-tube to the level of the beer in the body of the measure.

In order, when desirable, to prevent the liquor as it is being poured out of the measure from flowing through the vent out of the measuring tube, I have arranged the handle $c$ in close proximity to said measuring-tube, so that persons pouring the liquor from the measure can, if they choose while doing so, conveniently place their thumbs upon the vent, and so prevent the flow.

Heretofore the measuring-tube has communicated with a trap or box located inside or outside of the measure, as above stated, and the trap with the inside of the measure. In my device the tube communicates, by means of the perforations, directly with the inside of the measure, and the usual box or trap is dispensed with, leaving the bottom of the measure perfectly smooth.

I do not claim broadly, in a beer-measure, a flat glass plate, or a measuring-tube, or the screw-plug; but,

Having thus described my invention, what I claim herein as new, and wish to have secured by Letters Patent, is—

1. A beer or liquid measure provided with a measuring-tube having perforations near the bottom, and provided with a partition within it and near its lower end, substantially as and for the purposes set forth.

2. In a beer-measure, the combination, with the measuring-tube and the partition arranged therein, as shown and described, of a plug and an intervening packing arranged at the bottom of said tube, as described, for the purpose set forth.

In testimony that I claim the foregoing I have hereunto set my hand this 5th day of June, 1882.

GEORGE J. CAVE.

Witnesses:
OLIVER DRAKE,
CHARLES H. PELL.